(12) United States Patent  (10) Patent No.: US 8,547,920 B2
Chen  (45) Date of Patent: Oct. 1, 2013

(54) DIRECTIONAL DISCOVERY PROTOCOL WITH COORDINATED CHANNEL SELECTION

(75) Inventor: Richard Chen, Croton-on-Hudson, NY (US)

(73) Assignee: Koninklijke Philips N.V., Eindhoven (NL)

( * ) Notice: Subject to any disclaimer, the term of this patent is extended or adjusted under 35 U.S.C. 154(b) by 223 days.

(21) Appl. No.: 13/119,299

(22) PCT Filed: Sep. 3, 2009

(86) PCT No.: PCT/IB2009/053849
§ 371 (c)(1),
(2), (4) Date: Mar. 16, 2011

(87) PCT Pub. No.: WO2010/035157
PCT Pub. Date: Apr. 1, 2010

(65) Prior Publication Data
US 2011/0170511 A1    Jul. 14, 2011

Related U.S. Application Data

(60) Provisional application No. 61/099,918, filed on Sep. 25, 2008.

(51) Int. Cl.
*H04Q 7/00*    (2006.01)
(52) U.S. Cl.
USPC ............................. 370/329; 370/328; 370/330

(58) Field of Classification Search
USPC .......................... 370/328, 329, 330; 455/434
See application file for complete search history.

(56) References Cited

U.S. PATENT DOCUMENTS

| 2006/0050728 | A1 | 3/2006 | Sung et al. | |
|---|---|---|---|---|
| 2007/0105542 | A1 | 5/2007 | Friedman | |
| 2007/0165589 | A1* | 7/2007 | Sakoda | 370/345 |
| 2007/0268862 | A1* | 11/2007 | Singh et al. | 370/329 |
| 2008/0175197 | A1 | 7/2008 | Shao et al. | |
| 2008/0176561 | A1* | 7/2008 | Shao et al. | 455/434 |
| 2009/0067389 | A1* | 3/2009 | Lee et al. | 370/336 |
| 2011/0235559 | A1* | 9/2011 | Sakoda | 370/310 |
| 2012/0224565 | A1* | 9/2012 | Sakoda | 370/336 |

FOREIGN PATENT DOCUMENTS

| WO | WO2006067271 A1 | 6/2006 |
|---|---|---|
| WO | WO2008087596 A2 | 7/2008 |

* cited by examiner

*Primary Examiner* — Chuong T Ho
(74) *Attorney, Agent, or Firm* — Larry Liberchuk

(57) ABSTRACT

A method and system for communication device discovery and coordination of data channel selection between a first device and a second device in a Wireless Personal Area Network (WPAN). The method includes transmitting a set of discovery beacon blocks by the first and second devices in a discovery channel using an asynchronous contention based medium access mechanism; scanning the discovery channel by the first and second devices; and coordinating between the first and second devices to select a data channel by exchanging channel selection command frames in the discovery channel using the asynchronous contention based medium access mechanism.

15 Claims, 6 Drawing Sheets

Beacon Transmission in Discovery Channel

Beacon Transmission in Discovery Channel

Discovery Beacon Blocks of a Type A Device

Discovery Beacon Blocks of a Type B Device

Discovery Period of a Type A Device

Discovery Period of a Type B Device

Payload of Channel Selection Command Frame

Channel Selection Control Field

Discovery Scanning IE

Scan Timing Field

Channel Change IE

DIRECTIONAL DISCOVERY PROTOCOL WITH COORDINATED CHANNEL SELECTION

This application claims the benefit of U.S. Provisional Application No. 61/099,918 filed on Sep. 25, 2008.

The invention generally relates to device discovery in a network and, more particularly, to a method and device which utilizes a discovery protocol to find communication partner devices.

Developed by Ecma International, the ECMA-387 is a standard for a 60 GHz PHY (Physical layer) and MAC (Medium Access Control) for short range communications. The standard provides high rate WPAN (Wireless Personal Area Network) transport for both the bulk rate transfer and multimedia streaming.

The ECMA-387 standard defines three device types that interoperate with their own types independently and that can coexist and interoperate with other types. The three device types are defined as follows:

1. Type A device offers video streaming and WPAN applications in 10-meter range LOS/NLOS (Line-of-Sight/Non-Line-of Sight) multipath environments. It uses high gain trainable antennas. The Type A device is considered as the "high end"—high performance device.

2. Type B device offers video and data applications over a shorter range (1-3 meters) point to point LOS links with non-trainable antennas. The Type B device is considered as the "economy" device and trades off range and NLOS performance in favor of low cost implementation and low power consumption.

3. Type C device supports data only applications over point to point LOS links at less than 1-meter range with non-trainable antennas and no QoS (Quality of Service) guaranties. The Type C device is considered a "bottom end" device providing simpler implementation, lowest cost and lowest power consumption.

In the ECMA-387 MAC specification, there is a dedicated channel for device discovery and antenna beam forming. This channel is called a discovery channel. Devices of different capabilities send their corresponding beacon frames using various PHY modes in this channel. These beacons access the wireless medium using a contention based medium access mechanism known as listen before talk, or CSMA/CA (Carrier Sense Multiple Access/Collision Avoidance). The purpose of these beacons is to discover other device(s) with which the device will conduct data communications. Therefore, these beacons are referred to as discovery beacons.

ECMA-387 provides that the data exchange takes place at the data channel, which uses Distributed Reservation Protocol (DRP) for data transmission, where medium access is reservation based. In DRP based data transmission, all types of devices use a superframe structure.

Under the CSMA/CA contention based channel access, or Distributed Contention Access (DCA) mechanism, before transmitting discovery beacons in the discovery channel, the device senses the channel to determine if there is an ongoing discovery beacon transmission. If a discovery beacon transmission is detected, the device defers for a period of time equal to the Long Inter-Frame Space (LIFS) after the detected beacon transmission is completed. The device then generates a random backoff time for an additional deferral time before transmitting, unless the backoff timer already contains a non-zero value. The backoff time is chosen as SlotTime×RI, where SlotTime is the length of a DCA slot, and RI is a number randomly drawn from a uniform distribution over the Contention Window interval [0, CW]. The backoff procedure is illustrated in FIG. 1. The discovery channel 100 is occupied by a number of beacon frames 101, and between two beacon frames is the Beacon Inter-Frame Space (BIFS) 102. The medium is busy until the last beacon is sent. All backoff slots occur following a LIFS period 103 during which the medium is determined to be idle. If no transmission is detected for the duration of a particular backoff slot 104, then the backoff procedure will decrement its backoff time by a SlotTime. If any transmission is detected at any time during a backoff slot, then the backoff procedure is suspended; that is, the backoff timer will not decrement for that slot. The device will follow the procedure above as the channel is detected busy for the first time before the backoff procedure is allowed to resume. Transmission of discovery beacons 101 will commence when the backoff timer reaches zero.

In the discovery channel, discovery beacon frames might be sent directionally using a directional antenna. Therefore, when one device is sending its discovery beacon, the potential communication partners might be listening in a direction not facing the transmitter, thus delaying the discovery. There is a need to devise a discovery protocol that enables devices to find each other within a reasonable amount time.

In addition, different types of devices are using different PHY modes to send their discovery beacons. There is a need to devise a discovery protocol to enable different types of devices to find each other.

After devices find each other, the device pair needs to select a channel to exchange PHY Service Data Units (PSDUs). Due to the directional transmissions, the channel condition may be different for the transmitter and receiver even if they are sensing the same channel. There is a need to devise a channel selection protocol for the device to select a channel that both the devices agree on.

In a preferred embodiment of the invention, a method and protocol is provided for communication device discovery and coordination of data channel selection between a first device and a second device in a Wireless Personal Area Network (WPAN). The method includes transmitting a set of discovery beacon blocks by the first and second devices in a discovery channel using an asynchronous contention based medium access mechanism; scanning the discovery channel by the first and second devices; and coordinating between the first and second devices to select a data channel by exchanging channel selection command frames in the discovery channel using the asynchronous contention based medium access mechanism.

The discovery protocol with coordinated channel selection provided in a preferred embodiment of the present invention has the following features:
No requirement of an additional omni-directional antenna;
Asynchronous contention based medium access to reduce protocol complexity;
Maintains the efficiency of directional transmission;
Enables discovery of devices of different types;
Coordinated channel sensing in selection of data exchange channel.

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

Figure 1:
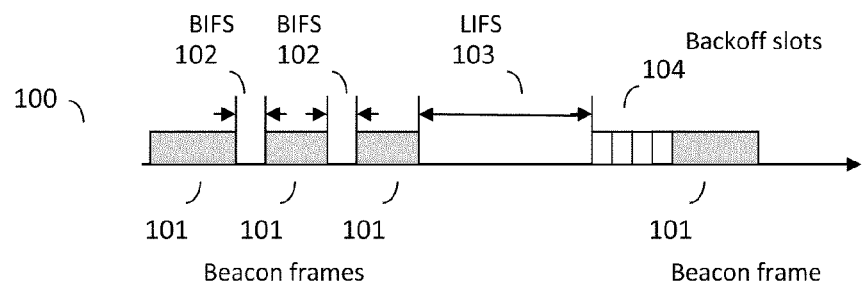
FIG. 1 illustrates the beacon transmissions in the discovery channel using contention based channel access.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Beacon Transmission using Asynchronous Contention based Medium Access

Devices use the discovery channel to discover other devices. After a pair of devices find each other, they switch to a data exchange channel they select and set up a superframe structure in the selected channel by sending synchronized beacons.

To reduce the protocol complexity, the unsynchronized discovery protocol is disclosed according to the present invention, such that discovery beacons are transmitted in the discovery channel using contention based medium access without using a synchronized superframe structure in the discovery channel.

Device Discovery

In a preferred embodiment of the invention, after powering up for the first time, a device discovers another device with which it intends to exchange MAC Protocol Data Units (MPDUs) according to the various embodiments described below.

Transmission of Beacons in the Discovery Channel

A device sets the status field of the beacon frames to "Discovery" when transmitting beacons in the discovery channel to discover neighbors. The beacons with the Status field set to "Discovery" are referred to as discovery beacons. To discover devices of different types that a discovering device supports, the device transmits beacons with status set to "Poll" in sequence using different PHY modes corresponding to the types of the devices that the discovering device intends to discover, as discussed further below. For example, a beacon frame transmitted by a Type A device using mode-B0 with status set to "Poll" is called a mode-B0 Poll frame. Distributed Contention Access (DCA) is used to transmit discovery beacons and Type B/Type C Poll frames in the discovery channel.

Transmission Modes

Discovery beacons are transmitted using the common PHY modes corresponding to a device type, more specifically, mode-D0, mode-B0 and mode-C0 for Type A, Type B and Type C devices respectively.

Type A

A Type A device starts to send discovery beacon blocks that consist of mode-D0 discovery beacons, mode-B0 and mode-C0 Poll frames in the discovery channel as described below.

Discovery Beacon Blocks of a Type A Device

Figure 2:
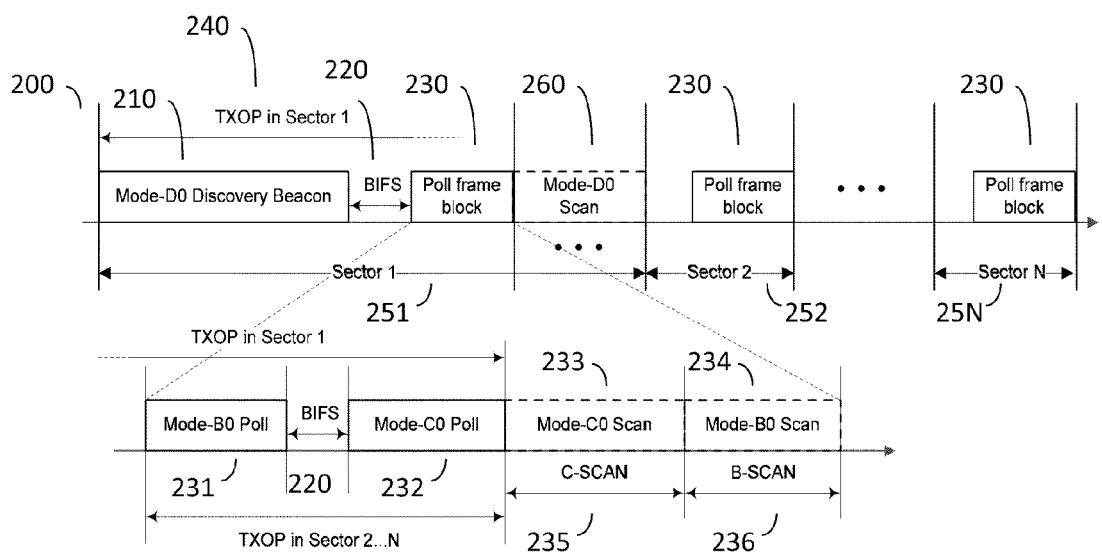
FIG. 2 illustrates the discovery beacon blocks of a Type A device.

FIG. 2 shows the timing of discovery beacon blocks 200 of a Type A device. The Type A device transmits mode-D0 discovery beacons 210 only in the discovery channel. The mode-D0 discovery beacons are omni-directional beacons.

After the completion of a mode-D0 discovery beacon transmission 210, the Type A device transmits one or more Poll frame block(s) 230. The number of Poll frame blocks is equal to the number of sectors the device is capable of covering using a number of antenna blocks or beams. A Poll frame block 230 consists of transmission of a mode-B0 Poll frame 231 and a mode-C0 Poll frame 232 in the same sector and scanning for mode-C0 233 and mode-B0 Poll 234 responses in the specified order. The transmission of the mode-D0 discovery beacon and the Poll frames in series is separated by a BIFS 220 and completed in one Transmission Opportunity (TXOP) 240. The scanning starts at a time equal to a Short Inter-Frame Space (SIFS) (not shown) after the end of the mode-C0 Poll frame transmission 232. The Type A device first scans for responses to the transmitted mode-C0 Poll frames 233 for the duration of C-SCAN 235, after which the Type A device scans for responses to the previously transmitted mode-B0 Poll frame 234 for the duration of B-SCAN 236. After scanning for the mode-B0 response 234, the Type A device scans for mode-D0 response 260 for the duration of D-SCAN. If the Type A device has multiple antennas that cover multiple sectors (251, 252, . . . , 25N), after the completion of the scanning in the first sector 251, the Type A device switches to the next sector 252 to transmit the next Poll frame block 230, in which the transmission of the mode-B0 231 and mode-C0 Poll 232 frames in series is separated by a BIFS 220 and completed in one TXOP 240.

Discovery of Additional Devices

In order to discover other devices after starting the transmission in a Data Channel, a Type A device switches back to the discovery channel and sends discovery beacon blocks as follows.

After starting the transmission of mode-A0 beacons in a channel, a Type A device makes a DRP reservation with Reservation Type set to "Absence" no later than the maximum allowed discovery latency (MaxDiscoveryLatency) superframes. The length of this DRP reservation is greater than the minimal time needed by the Type A device to transmit a Type A discovery beacon block that consists of a mode-D0 beacon, mode-B0 and mode-C0 Poll frames. Within this reservation, the Type A device changes to the discovery channel and transmits a discovery beacon block as described above in the section "Discovery beacon blocks of a Type A device".

Randomization of Discovery Period

Figure 4:
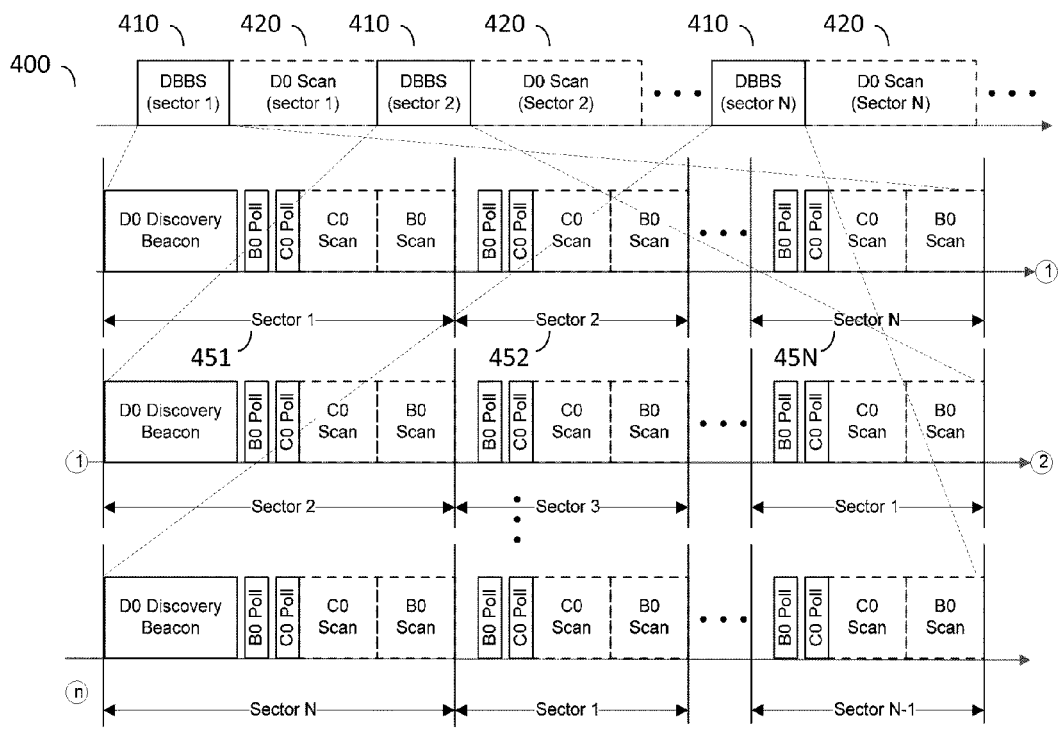
FIG. 4 illustrates the discovery period of a Type A device.

FIG. 4 illustrates the discovery period 400 of a Type A device. Each time after transmitting a set of discovery beacon blocks 410 as described above, a device schedules another transmission of the same set of discovery beacon blocks 410 at a time randomly drawn from a uniform distribution over an interval, [DBPMin, DBPMax], measuring from the start of the previous transmission of such a set of discovery beacon blocks. Before the scheduled transmission of the next set of discovery beacon blocks, a Type A device scans for mode-D0 discovery beacons or responses 420. The device repeats the above randomized discovery procedure until a response to the transmitted discovery beacons or Poll frames is received as described above.

A device switches to the next sector 452 to transmit the next set of discovery beacon blocks 410 using a different antenna block or beam, if it covers multiple sectors (451, 452, . . . 45N) using a number of antenna blocks, or beams. In one embodiment the order of antenna blocks or beams used when switching is the same as the order used for transmitting its poll frame blocks.

If a mode-D0 beacon is received correctly in the discovery channel, the Type A device may start the antenna training with the device from which the mode-D0 beacon is received.

The discovery beacon sent in the discovery channel after starting the transmission of mode-A0 beacons in a channel includes a Channel Change IE (Information Element) to indicate which channel the device sends the mode-A0 beacons. The initial channel selection process is discussed later in the "Initial Channel Selection" section below.

Type B

A Type B device starts to send discovery beacon blocks that consist of mode-B0 discovery beacons and mode-C0 Poll frames in the discovery channel as described below.

Discovery beacon blocks of a Type B device

Figure 3:
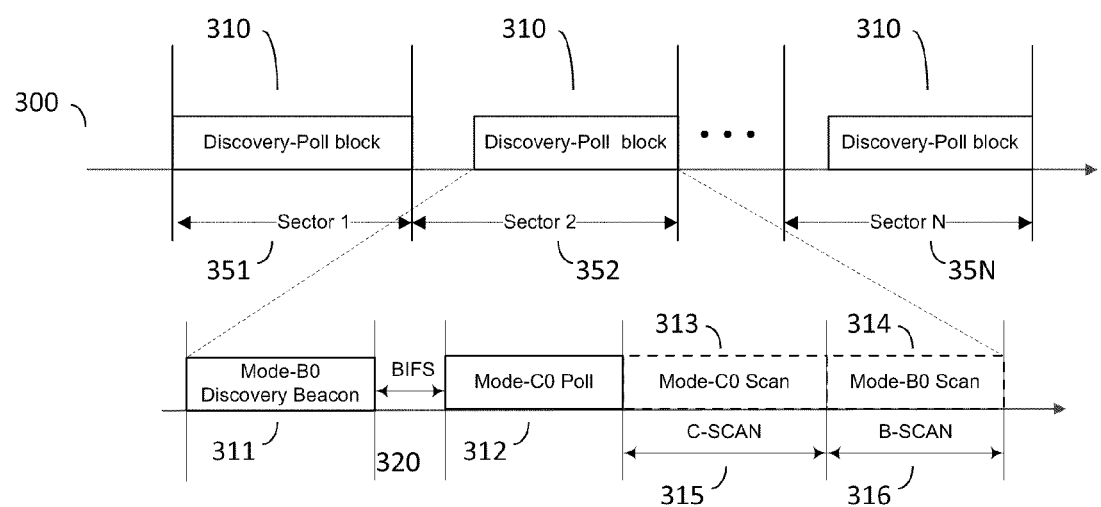
FIG. 3 illustrates the discovery beacon blocks of a Type B device.

FIG. 3 illustrates the timing of Type B discovery blocks 300. A Type B device transmits mode-B0 discovery beacons 311 only in the discovery channel. In the discovery-poll block 310, after the completion of a mode-B0 discovery beacon transmission 311, the Type B device transmits mode-C0 Poll frame 312, followed by scanning for mode-C0 response 313 and mode-B0 response 314. The transmission of mode-B0 discovery beacon 311, mode-C0 Poll frame 312 are separated by BIFS 320 and completed in one TXOP obtained. The scanning starts SIFS time (not shown) after the end of mode-C0 Poll frame transmission. The Type B device first scans for responses to the transmitted mode-C0 Poll frames 313 for a duration of C-SCAN 315, after which the Type B device scans for responses to the previously transmitted mode-B0 discovery beacon 314 for a duration of B-SCAN 316. If the Type B device has multiple antennas that cover multiple sectors (351, 352, ..., 35N), after the completion of the scanning in the first sector 351, the Type B device switches to the next sector 352 and repeats the same discovery-poll block for every sector the device can cover using a different antenna block, or beam.

After sending a set of discovery beacon blocks, the Type B device scans for mode-B0 beacon or Poll frames as discussed below.

Randomization of Discovery Period

Figure 5:
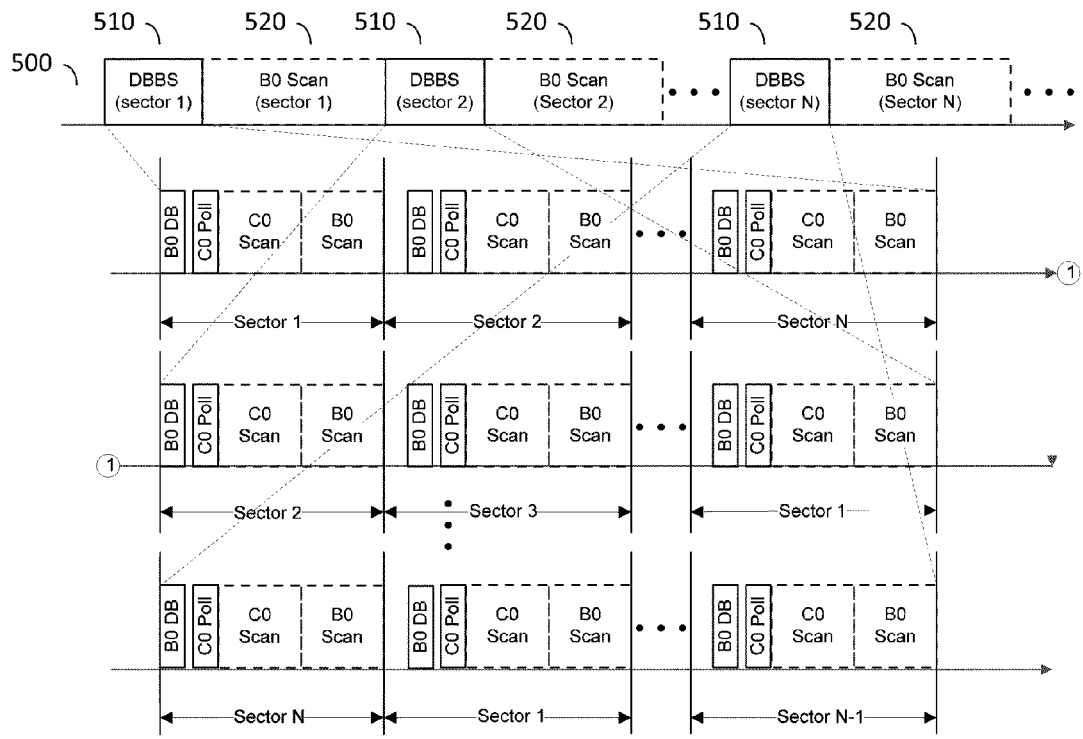
FIG. 5 illustrates the discovery period of a Type B device.

FIG. 5 illustrates the discovery period 500 of a Type B device. Each time after transmitting a set of discovery beacon blocks 510 as described above, a device schedules another transmission of the same set of discovery beacon blocks 510 at a time randomly drawn from a uniform distribution over the interval, [DBPMin, DBPMax], measuring from the start of the previous transmission of such a set of discovery beacon blocks. Before the scheduled transmission of the next set of discovery beacon blocks, a Type B device scans for mode-B0 discovery beacon and Poll frames 520. The device repeats the above randomized discovery procedure until a response to the transmitted discovery beacons or Poll frames is received as described above.

A device switches to the next sector to transmit the next set of discovery beacon blocks using a different antenna block or beam, if it covers multiple sectors using a number of antenna blocks, or beams. In one embodiment the order of antenna blocks, or beams used when switching is the same as the order used for transmitting its discovery-poll blocks.

If a mode-B0 beacon or Poll frame is received correctly in the discovery channel, the Type B device starts an initial channel selection process with the device from which the mode-B0 beacon or Poll frame is received, as described later in the "Initial Channel Selection" section.

Type C

A Type C device scans each channel for at least one superframe, after powering up for the first time. If it does not receive any mode-C0 Poll frames during the scan, the device scans the discovery channel for at least a period equal to a predefined value, DBPMax. After the scan, the Type C device does not transmit any frames unless the scanning indicates one the following conditions is true:

If a channel is detected as busy and at least one mode-C0 Poll frame is received correctly, the Type C device may associate with the device from which the mode-C0 Poll frame is received.

If it the Type C device has detected an idle channel during the scan and has not associated with another device by responding to any mode-C0 Poll Frame, the Type C device starts transmitting mode-C0 Poll frame in the channel.

If a mode-C0 poll frame sent by a Type A/B master device is received correctly in the discovery channel, the Type C device follows the initial channel selection process with the Master device from which the mode-C0 Poll is received, as described below in the "Initial Channel Selection" section.

Initial Channel Selection

In a preferred embodiment of the invention, a Type A or B device uses the Initial Channel Selection process to select a channel to send its mode-A0 or mode-B0 data beacons, B Poll or Type C Poll frames, before it sets up or joins a beacon group in that channel.

A device does not start initial channel selection unless the device has received a discovery beacon or poll frame in the discovery channel from another device with which it intends to exchange MPDUs. In one embodiment the device transmits channel selection command frames only in the discovery channel using DCA. In the initial channel selection process, the device first coordinates explicit channel scanning with the newly discovered device with an Explicit Channel Scan, followed by an Explicit Channel Switch.

Explicit Channel Scan

A device requests a newly discovered device to perform channel scanning by sending a Channel Scanning Request. Once the device receives an ACK frame to its Channel Scanning Request, the device leaves the discovery channel to scan the same channel(s) as specified in its Channel Scanning Request. At the time it specified in the Discovery Scanning IE in its Channel Scanning Request, the device returns to discovery channel to listen for Channel Scanning Response.

Upon reception of such a Channel Scanning Request, a device responds with an ACK frame, after which it performs the requested scanning in the channels indicated in the Channel Scanning Request. The device returns back to discovery channel at the time indicated in the Channel Scanning Request and sends a Channel Scanning Response which includes DRP available IE(s) to indicate the scanning result.

Explicit Channel Switch

Upon reception of a Channel Scanning Response, a device sends a Channel Change Request to the device from which it received the Channel Scanning Response. After sending a Channel Change Request, the device listens for a Channel Change Response. Once it receives a Channel Change Response with Reason Code field set to "Accepted", it waits for a period of time that is randomly chosen over a range ([0, SuperframeLength]) before switching to the accepted channel to set up a superframe structure with the exception that the pair of devices will engage in a Master-Slave operation in the agreed channel. If the device receives a frame with the Reason Code field set to a value other than "Accepted", the device transmits a revised channel change request. The device does not switch to a channel that is not accepted by the recipient.

Upon reception of a Channel Change Request, a device responds with a Channel Change Response frame with the Reason Code field appropriately set as in Table 2 below. A device does not switch to a channel until an ACK frame to its accepted Channel Change Response is received. Before it switches to an agreed channel to set up a superframe structure, the device waits for a period of time that is randomly chosen over the range [0, SuperframeLength] with the exception that the pair of devices will engage in a Master-Slave operation in the agreed channel.

Channel Selection Command Frame Format

In a preferred embodiment of the invention, a set of Channel Selection Command frames are used to request channel scanning, to respond with channel scanning results and to select a channel to exchange MSDUs.

The ACK policy field in the MAC header of the Channel Selection Command frame is always set to 1 mm-ACK (Immediate Acknowledgement).

Figure 6:
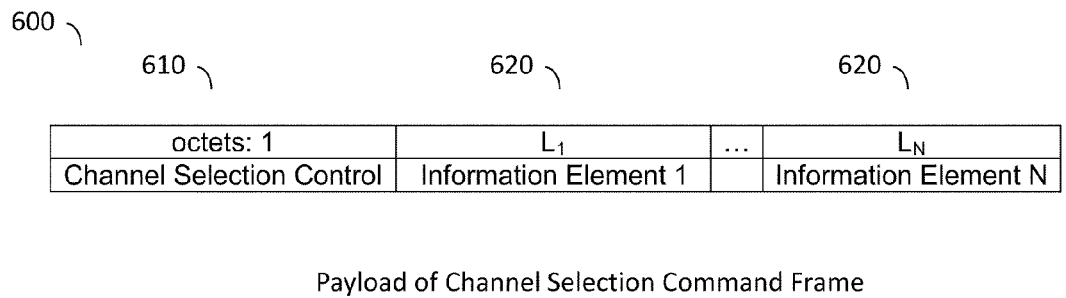
FIG. 6 illustrates a payload format for channel selection command frames.
Figure 7:
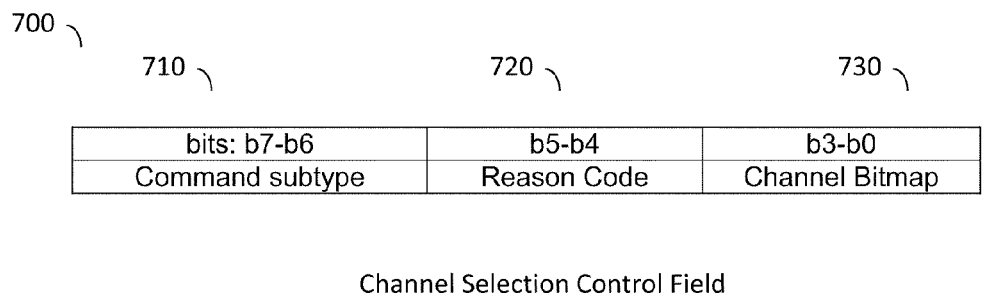
FIG. 7 illustrates a channel selection control field.

FIG. 6 illustrates the payload of a Channel Selection Command frame 600, which includes a Channel Selection Control field 610, and one or more Information Elements 620. FIG. 7 illustrates the details of a Channel Selection Control field 700, which contains a Command Subtype field 710, a Reason Code field 720, and a Channel Bitmap field 730.

The encoding of Subtype is illustrated in Table 1 below.

TABLE 1

Subtype field encoding

| Value | Subtype |
|---|---|
| 0 | Channel Scanning Request |
| 1 | Channel Scanning Response |
| 2 | Channel Change Request |
| 3 | Channel Change Response |

The followings are details of the set of Channel Selection commands.

Channel Scanning Request Command

In a Channel Scanning Request command, the Channel Bitmap field is set such that the bits corresponding to the channels requested to be scanned are set to ONE. The Reason Code field in a Channel Scanning Request is reserved. The first Information Element field includes a Discovery scanning IE to indicate the time when the device returns back to the discovery channel to listen for a scanning response to the scanning request.

Channel Scanning Response Command

In a Channel Scanning Response command, the Channel Bitmap field is set the same as the Channel Scanning Request that the device is responding to. The Reason Code field in a Channel Scanning Response is reserved. The Information Element fields include a number of DRP available IEs. The number of DRP available IEs is the same as the number of channels requested to be scanned.

Channel Change Request Command

In a Channel Change Request command, the first Information Elements field includes a Channel Change IE. Fields of Reason Code and Channel Bitmap fields in a Channel Change Request are reserved.

Channel Change Response Command

In a Channel Change Response command, the first Information Element field includes a Channel Change IE that is the same as the one in the Channel Change Request to which it is responding. Channel Bitmap field is reserved in the Channel Change Response. Field of Reason Code is set appropriately as listed in Table 2 below.

TABLE 2

Reason code field encoding

| Value | Code | Meaning |
|---|---|---|
| 0 | Accepted | The channel change request is agreed upon |
| 1 | Unavailable | The channel change request is rejected because the channel in concern does not have enough medium access slots |
| 2 | Conflict | The channel change request is rejected because the channel change request conflicts with the scanning response sent. |
| 3 | Invalid | The device does not support channel |

Discovery Scanning IE

Figure 8:
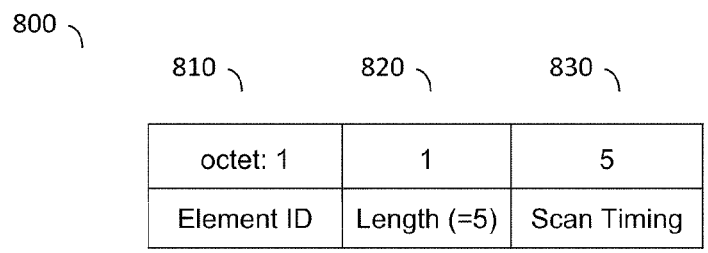
FIG. 8 illustrates a discovery scanning IE format.

The Discovery Scanning IE provides the information on the start time and duration of scanning to discover other device(s) in the discovery channel using the same antenna beam as the one used to transmit this beacon frame. A device includes discovery scanning IE in its beacon if the status bit of the beacon frame is set to discovery. FIG. 8 illustrates the format of a Discovery Scanning IE 800, which includes an Element ID 810, Length 820 and a Scan Timing field 830.

Figure 9:
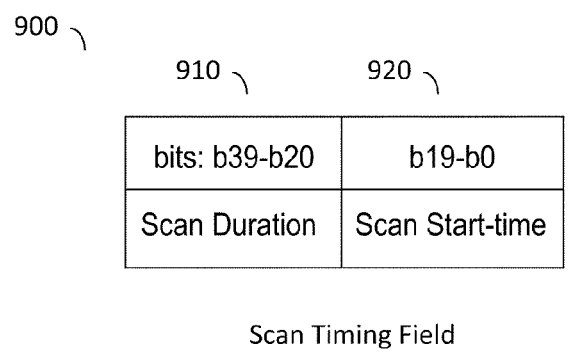
FIG. 9 illustrates a scanning timing format.

The Scan Timing field is set to the start time and duration of the discovery scanning. FIG. 9 illustrates a Scan Timing field 900, which includes a Scan Duration 910 and Scan Start-time 920.

Scan Start-time field is set to the starting time of scanning using the same antenna beam measured from the end of the Physical Layer Convergence Protocol (PLCP) header of the beacon frame in units of microseconds.

Scan Duration is set to the duration of the scanning in units of microseconds, using the same antenna beam.

Channel Change IE

A Channel Change IE announces that a device is preparing to change to another channel.

Figure 10:
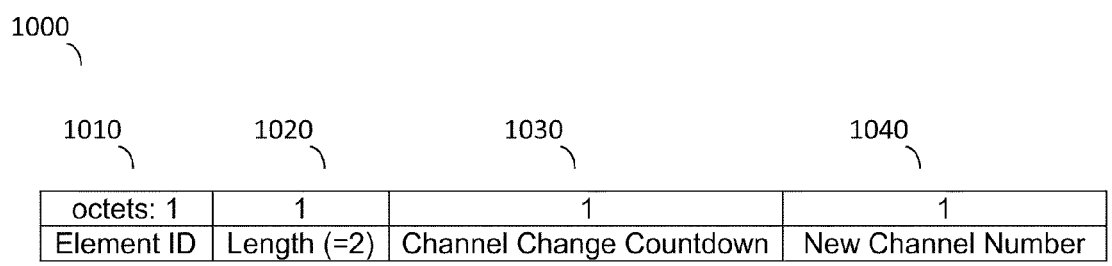
FIG. 10 illustrates a channel change IE format.

FIG. 10 illustrates a Channel Change IE 1000, which includes an Element ID 1010, a Length 1020, a Channel Change Countdown field 1030 and a New Channel Number field 1040.

The Channel Change Countdown field is set to the number of superframes remaining until the device changes to the new channel. If this field is zero, the device will change to the new channel at the end of the current superframe.

The present invention can be used in wireless docking, wireless fast sync/downloading, wireless HDMI and wireless USB, for examples.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

Most preferably, the principles of the invention are implemented as any combination of hardware, firmware and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

What is claimed is:

1. A method for communication device discovery and coordination of data channel selection between a first device and a second device in a Wireless Personal Area Network (WPAN), the method comprising:
    transmitting a set of discovery beacon blocks by the first and second devices in a discovery channel using an asynchronous contention based medium access mechanism;
    scanning the discovery channel by the first and second devices; and
    coordinating between the first and second devices to select a data channel by exchanging channel selection command frames in the discovery channel using the asynchronous contention based medium access mechanism.

2. The method of claim 1, wherein the exchanging channel selection command frames comprises:
    the first device requests the second device to perform channel scanning by sending a channel scanning request command;
    the second device responds to the channel scanning request command by sending an ACK frame, and performs the requested scanning;
    the first device performs its own channel scan upon receiving the ACK frame;
    the second device reports to the first device scanning results by sending a channel scanning response;
    the first device selects a data channel based on the scanning results and requests the second device to change to the selected data channel by sending a channel change request command; and
    the second device accepts or rejects the selected data channel by sending a channel change response command.

3. The method of claim 1, wherein at least one of the first and second devices contains multiple antennas covering multiple sectors, and
    wherein the transmitting of the set of discovery beacon blocks by the at least one of the first and second devices comprises:
    transmitting an omni-directional discovery beacon; and
    transmitting one or more poll frames over each of the multiple sectors, one sector after another sector; and
    wherein the scanning of the discovery channel by the at least one of the first and second devices comprises:
    scanning for omni-directional discovery beacons; and
    scanning for responses over each of the multiple sectors, one sector after another sector.

4. The method of claim 1, wherein at least one of the first and second devices contains multiple antennas covering multiple sectors, and
    wherein the transmitting the one or more discovery beacon blocks by the at least one of the first and second devices comprises: transmitting a discovery beacon and one or more poll frames over each of the multiple sectors, one sector after another sector; and
    wherein the scanning of the discovery channel by the at least one of the first and second devices comprises: scanning for discovery beacons and poll frames over each of the multiple sectors, one sector after another sector.

5. The method of claim 1, further comprising:
    after transmitting the set of discovery beacon blocks, transmitting the same set of discovery beacon blocks at a time randomly drawn from a uniform distribution over an interval, and repeating the transmitting until a response is received.

6. The method of claim 5, wherein the device contains multiple antennas covering multiple sectors, switching from one sector to a next sector to transmit the same set of discovery beacon blocks.

7. The method of claim 3, further comprising: upon receiving an omni-directional beacon, beginning one of the following procedures:
    an antenna training procedure, a channel selection procedure, and a device association procedure.

8. The method of claim 1, wherein the channel change command frames have a frame format comprising:
    a channel selection control field; and
    one or more information element fields.

9. The method of claim 8, wherein the channel selection control field comprises:
    a subtype value indicating that the command frame is one of a channel scanning request, channel scanning response, channel change request, and channel change response;
    a reason code; and
    a channel bitmap.

10. A communication system comprising at least a first device and a second device in a Wireless Personal Area Network (WPAN), the first and second devices being configured to:
    transmit a set of discovery beacon blocks in a discovery channel using an asynchronous contention based medium access mechanism;
    scan the discovery channel; and
    coordinate between the first and second devices to select a data channel by exchanging channel selection command frames in the discovery channel using the asynchronous contention based medium access mechanism.

11. The system of claim 10, wherein the exchanging channel selection command frames comprises:
    the first device requests the second device to perform channel scanning by sending a channel scanning request command;
    the second device responds to the channel scanning request command by sending an ACK frame, and performs the requested scanning;
    the first device performs its own channel scan upon receiving the ACK frame;
    the second device reports to the first device scanning results by sending a channel scanning response;
    the first device selects a data channel based on the scanning results and requests the second device to change to the selected data channel by sending a channel change request command; and
    the second device accepts or rejects the selected data channel by sending a channel change response command.

12. The system of claim 10, wherein at least one of the first and second devices contains multiple antennas covering multiple sectors, and
    the at least one of the first and second devices transmits the set of discovery beacon blocks by:
    transmitting an omni-directional discovery beacon; and
    transmitting one or more poll frames over each of the multiple sectors, one sector after another sector; and
    the at least one of the first and second devices scans the discovery channel by:
    scanning for omni-directional discovery beacons; and
    scanning for responses over each of the multiple sectors, one sector after another sector.

13. The system of claim 10, wherein at least one of the first and second devices contains multiple antennas covering multiple sectors, and
- the at least one of the first and second devices transmits the set of discovery beacon blocks by:
- transmitting a discovery beacon and one or more poll frames over each of the multiple sectors, one sector after another sector; and
- the at least one of the first and second devices scans the discovery channel by:
- scanning for discovery beacons and poll frames over each of the multiple sectors, one sector after another sector.

14. The system of claim 10, wherein the first and second devices are further configured to:
- after transmitting the set of discovery beacon blocks, transmit the same set of discovery beacon blocks at a time randomly drawn from a uniform distribution over an interval, and repeating the transmitting until a response is received.

15. A non-transitory computer readable medium having stored thereon computer executable code which, when executed, causes a processor in a first device and a second device to perform the process of communication device discovery and coordination of data channel selection between the first device and a second device in a Wireless Personal Area Network (WPAN), the process comprising:
- transmitting a set of discovery beacon blocks by the first and second devices in a discovery channel using an asynchronous contention based medium access mechanism;
- scanning the discovery channel by the first and second devices; and
- coordinating between the first and second devices to select a data channel by exchanging channel selection command frames in the discovery channel using the asynchronous contention based medium access mechanism.

* * * * *